US007645825B2

(12) United States Patent
Seki

(10) Patent No.: US 7,645,825 B2
(45) Date of Patent: Jan. 12, 2010

(54) FLAME-RETARDANT POLYAMIDE COMPOSITION

(75) Inventor: Masashi Seki, Sodegaura (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 34 days.

(21) Appl. No.: 11/920,263

(22) PCT Filed: Mar. 9, 2006

(86) PCT No.: PCT/JP2006/304654

§ 371 (c)(1), (2), (4) Date: Nov. 13, 2007

(87) PCT Pub. No.: WO2006/123469

PCT Pub. Date: Nov. 23, 2006

(65) Prior Publication Data

US 2009/0069479 A1 Mar. 12, 2009

(30) Foreign Application Priority Data

May 16, 2005 (JP) ............................. 2005-142537

(51) Int. Cl.
*C08K 3/38* (2006.01)
*H01B 3/04* (2006.01)

(52) U.S. Cl. ....................................... 524/405; 524/449

(58) Field of Classification Search .................. 524/405
See application file for complete search history.

(56) References Cited

U.S. PATENT DOCUMENTS 4,074,032 A 2/1978 Naarmann et al.

FOREIGN PATENT DOCUMENTS

| | | | | |
|---|---|---|---|---|
| JP | 53-96056 | A | | 8/1978 |
| JP | 63-223060 | A | | 9/1988 |
| JP | 05-194842 | A | | 8/1993 |
| JP | 06-263985 | A | | 9/1994 |
| JP | 06-345963 | A | | 12/1994 |
| JP | 08-311333 | A | | 11/1996 |
| JP | 08311333 | A | * | 11/1996 |
| JP | 09-227625 | A | | 9/1997 |
| JP | 2000265055 | A | * | 9/2000 |
| JP | 2001-031863 | A | | 2/2001 |
| JP | 2001-207053 | A | | 7/2001 |
| JP | 2003-327726 | A | | 11/2003 |

OTHER PUBLICATIONS

Translation of JP 08311333, Nov. 1996.*
Translation of JP2000265055, Sep. 2000.*

* cited by examiner

*Primary Examiner*—Ling-Siu Choi
*Assistant Examiner*—Hui Chin
(74) *Attorney, Agent, or Firm*—Buchanan Ingersoll & Rooney PC

(57) ABSTRACT

A flame-retardant polyamide composition having excellent properties in mechanical properties such as toughness, in heat resistance, incombustibility and flowability in a reflow soldering process, and in heat stability during molding. There is provided a flame-retardant polyamide composition comprising 20 to 80% by mass of polyamide resin (A), 5 to 40% by mass of flame retardant with specific bromine content and molecular weight (B) and 0.5 to 10% by mass of flame retardant auxiliary agent (C) optionally together with hydrotalcite compound of specific composition (D).

10 Claims, 1 Drawing Sheet

FLAME-RETARDANT POLYAMIDE COMPOSITION

TECHNICAL FIELD

The present invention relates to a flame-retardant polyamide composition having excellent properties in mechanical properties such as toughness, in heat resistance and especially flowability in a reflow soldering process, and in heat stability during molding.

More particularly, the present invention relates to a flame-retardant polyamide composition useful in the field in which an electric and electronic part such as a fine pitch connector, that is especially thin and has short distance between connector terminals, is molded, and then the part is assembled by a surface mounting method using a high-melting solder such as a lead-free solder.

BACKGROUND ART

In the past, a polyamide resin that is capable of being molded into a prescribed shape by heat-melting has been used as a material for molding an electronic part. Generally, as a polyamide, 6-nylon, 66-nylon, and the like have been widely used. However, such an aliphatic polyamide lacks sufficient heat resistance as a raw material for producing a surface mount part such as a connector that is exposed to high temperature like a reflow soldering process, although it is excellent in moldability. With such a background, 46-nylon has been developed as a polyamide having high heat resistance, but it has a problem of high water absorption. For this reason, an electric and electronic part molded by using 46-nylon resin composition may sometimes change in size by water absorption, thereby causing such a problem as blistering, so-called bulging, during heating in a reflow soldering process when a molded article contains absorbed water. Particularly, in recent years the surface mounting method is being shifted to the use of a lead-free solder in view of an environmental concern. A lead-free solder has higher melting point as compared with a conventional lead solder, inevitably increasing a mounting temperature by 10 to 20° C., and thus the use of 46-nylon is becoming difficult.

As a countermeasure, an aromatic polyamide derived from an aromatic dicarboxylic acid such as terephthalic acid and an aliphatic alkylene diamine has been developed. An aromatic polyamide has further excellent properties in heat resistance and low water absorption as compared with an aliphatic polyamide such as 46-nylon. However, it has a problem of lacking toughness though it is possible to improve rigidity as compared with 46-nylon. Especially, in the use of a thin fine-pitch connector, if a connector material is poor in toughness, such phenomena as cracking and whitening occur during pushing in and pulling off of a terminal, and thus it has been desired to develop a material having high toughness.

For the above-mentioned problems, it is possible to improve toughness by increasing the content of a polyamide resin and decreasing the amount of a flame retardant. However, in the use of an electronic part such as a connector, high flame and fire retardancy, such as V-0 rating, which is generally stipulated in the Underwriters Laboratories standard UL-94 is often requested, but it has been difficult to attain good toughness without impairing incombustibility.

In order to increase toughness by improving compatibility between a polyamide resin and a flame retardant, there is a publicly known technology to use a brominated polyphenylene ether or a poly(brominated styrene) containing an epoxy group in the molecule as a flame retardant. However, in the case of a resin such as an aromatic polyamide resin that is molded at high temperature, there have been the cases where its use was restricted because such phenomena as decomposition of a molding material, variance and decrease of product mechanical properties, and formation of a discolored material occurred due to insufficient heat stability during molding.

In Patent Document 1, a flame retardant polyamide resin composition comprising an aromatic polyamide and a brominated polystyrene having low viscosity is disclosed. However, there is a problem that sufficient toughness and heat resistance are not attained. Also, in Patent Document 2, a flame retardant resin composition comprising an aliphatic polyamide and a brominated polystyrene having a specific molecular weight is disclosed, but it has a problem in heat resistance and flowability. Further, in Patent Document 3, a flame retardant polyamide resin composition using poly(brominated styrene) as a flame retardant is disclosed, but it has a problem that sufficient heat resistance is not attained.

In addition to the above-mentioned problems, in a flame retardant composition using an aromatic polyamide resin having melting point of 300° C. or above, the molding temperature is so high that discoloration of a molding material or a molded article due to partial elimination of bromine group contained in the flame retardant and corrosion of a mold due to generation of bromine gas can take place easily, and thus development of a material having good moldability is desired.

Further, in Patent Documents 4 and 5, a technology relating to a flame retardant composition comprising nylon-4,6, and as a flame retardant, a halogenated aromatic compound and a hydrotalcite compound are disclosed, but the composition lacks sufficient heat stability during molding under the conditions of high temperature and long duration. In addition, it is inferior in heat resistance, or blister resistance, in a reflow soldering process using a lead-free solder.

In Patent Document 6, a flame retardant composition comprising an aromatic polyamide resin, and as a flame retardant, a terminal-modified poly(bromophenylene oxide) and a hydrotalcite compound whose crystal water is removed by 30% or more is disclosed. But, in the flame retardant composition, it also lacks sufficient heat stability during molding under the conditions of high temperature and long duration.

Patent Document 1: Japanese Patent Laid-Open Publication No. H6-263985

Patent Document 2: Japanese Patent Laid-Open Publication No. H9-227625

Patent Document 3: Japanese Patent Laid-Open Publication No. H5-194842

Patent Document 4: Japanese Patent Laid-Open Publication No. S63-223060

Patent Document 5: Japanese Patent Laid-Open Publication No. H6-345963

Patent Document 6: Japanese Patent Laid-Open Publication No. 2001-31863

DISCLOSURE OF THE INVENTION

Problem to be Solved by the Invention

An object of the present invention is to provide a flame-retardant polyamide composition having excellent heat stability during molding at high temperatures, and good incombustibility, flowability, toughness, and heat resistance in surface mounting using a lead-free solder in a reflow soldering process.

Means to Solve the Problem

The present inventors have therefore carried out extensive investigation to address the above problems, and as a result, found that a flame-retardant polyamide composition comprising a polyamide resin, a brominated polystyrene with a specific bromine content and a molecular weight as a flame retardant, a flame retardant auxiliary agent, and optionally a specific hydrotalcite compound, has excellent molding stability, incombustibility, flowability, toughness, good heat resistance in a surface mounting using a lead-free solder in a reflow soldering process, and have accomplished the present invention.

That is to say, the present invention provides:

(1) A flame-retardant polyamide composition comprising (A) 20 to 80% by mass of a polyamide resin, (B) 5 to 40% by mass of a flame retardant, and (C) 0.5 to 10% by mass of a flame retardant auxiliary agent, wherein the bromine content in the flame retardant (B) is 65 to 71% by mass and its weight-average molecular weight is 1000 to 4800.

(2) The flame-retardant polyamide composition according to the above (1), wherein the polyamide resin (A) comprises (a-1) a polyfunctional carboxylic acid component unit composed of 30 to 100% by mol of terephthalic acid unit, 0 to 70% by mol of a polyfunctional aromatic carboxylic acid component unit other than terephthalic acid and/or 0 to 70% by mol of a polyfunctional aliphatic carboxylic acid component unit having 4 to 20 carbon atoms, and (a-2) a polyfunctional amine component unit having 4 to 25 carbon atoms.

(3) The flame-retardant polyamide composition according to the above (1), wherein a melting point and an intrinsic viscosity [η] as measured in concentrated sulfuric acid at 25° C. of the polyamide resin (A) are 280 to 340° C. and 0.5 to 1.2 dl/g, respectively.

(4) The flame-retardant polyamide composition according to the above (1), wherein a molecular weight distribution (weight-average molecular weight (Mw)/number-average molecular weight (Mn)) of the flame retardant (B) is 1.05 to 1.25.

(5) The flame-retardant polyamide composition according to the above (1), wherein the flame retardant auxiliary agent (C) is at least one kind or more selected from an antimony compound, zinc borate, zinc stannate, zinc phosphate, calcium borate, and calcium molybdate.

(6) The flame-retardant polyamide composition according to the above (1), wherein it contains 0 to 60% by mass of at least one kind or more selected from a glass, mica, and titanium oxide as a reinforcing material (D).

(7) The flame-retardant polyamide composition according to the above (1), wherein it contains 0.05 to 0.4% by mass of a hydrotalcite compound (E).

(8) The flame-retardant polyamide composition according to the above (7), wherein the hydrotalcite compound (E) is represented by the following formula (1).

$$Mg_{1-x}Al_x(OH)_2(A)^{n-}{}_p mH_2O \quad (1)$$

Here, $0.27 \leqq x \leqq 0.35$, $p=x/n$, A: an anion with n-valency, and $0.3 \leqq m \leqq 0.7$.

(9) A molded article obtained by molding the flame-retardant polyamide composition according to the above (1).

(10) An electric and electronic part obtained by molding the flame-retardant polyamide composition according to the above (1).

Effect of the Invention

By using a flame-retardant polyamide composition of the present invention, a molded article having excellent heat resistance required for the surface mounting using a lead-free solder, in addition to good heat stability during molding, incombustibility, flowability, and toughness can be obtained, and thus the present invention is of high industrial value.

BRIEF DESCRIPTION OF THE DRAWING

FIG. 1 is a drawing that shows a relationship between temperature and time for the reflow heat resistance test in the reflow process carried out in Examples and Comparative Examples of the present invention.

Figure 1:
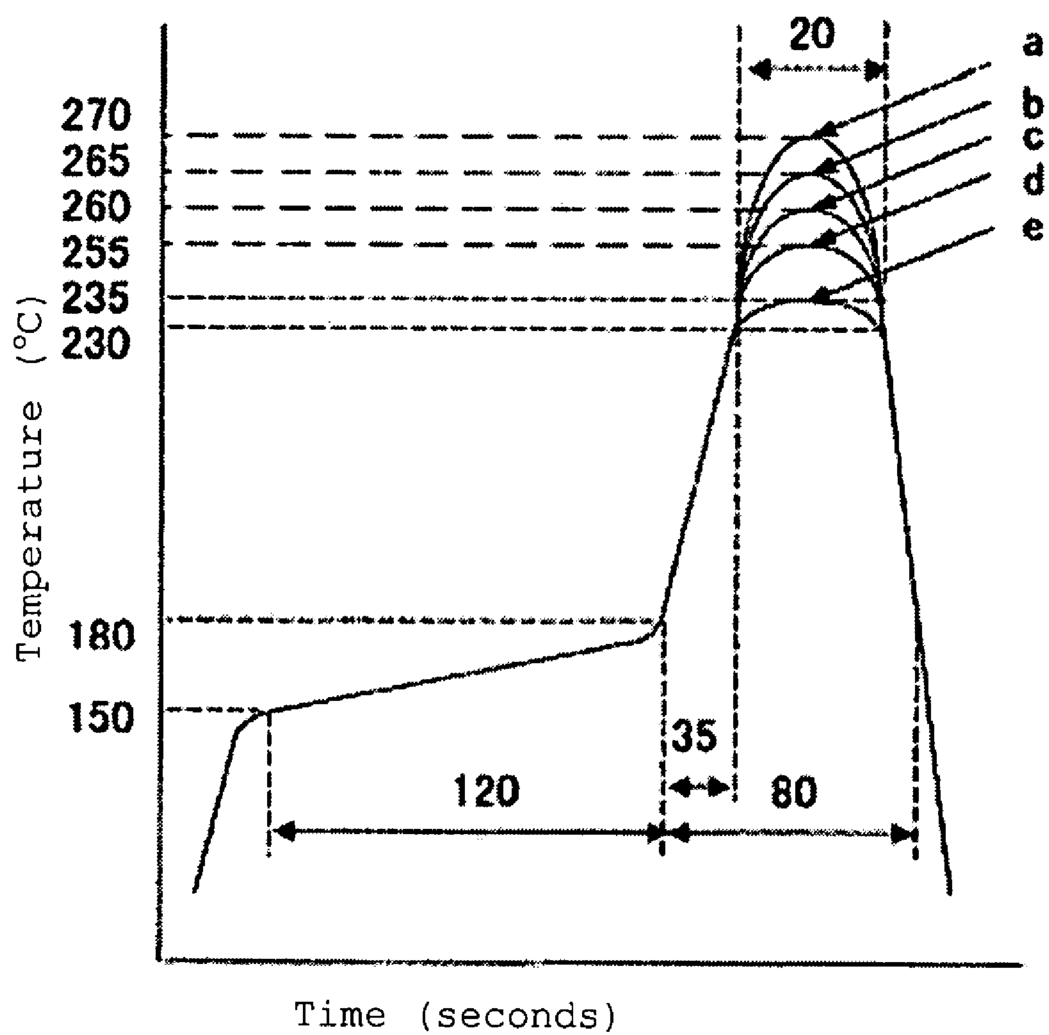
[FIG. 1]

EXPLANATION OF SYMBOLS a Heating temperature in reflow process: 270° C.
b Heating temperature in reflow process: 265° C.
c Heating temperature in reflow process: 260° C.
d Heating temperature in reflow process: 255° C.
e Heating temperature in reflow process: 235° C.

BEST MODE FOR CARRYING OUT THE INVENTION

In the following, the present invention is explained in more detail.

[Polyamide Resin (A)]

A polyamide resin (A) of the present invention comprises (a-1) a polyfunctional carboxylic acid component unit and (a-2) a polyfunctional amine component unit.

[Polyfunctional Carboxylic Acid Component Unit (a-1)]

A polyfunctional carboxylic acid unit (a-1) constituting a polyamide resin (A) of the present invention preferably comprises 30 to 100% by mol of terephthalic acid component unit and 0 to 70% by mol of an aromatic polyfunctional carboxylic acid component unit other than terephthalic acid and/or 0 to 70% by mol of an aliphatic polyfunctional carboxylic acid component unit having 4 to 20 carbon atoms, wherein the total amount of the polyfunctional carboxylic acid component units is 100% by mol. As examples of these aromatic carboxylic acid units other than terephthalic acid, there may be mentioned isophthalic acid, 2-methylterepthalic acid, naphthalene dicarboxylic acid, phthalic anhydride, trimellitic acid, pyromellitic acid, trimellitic anhydride, pyromellitic anhydride, and the like, and isophthalic acid is particularly preferred. In addition, they may be used singly or in a combination of two kinds or more. When a polyfunctional compound having three or more functional groups is used, its added amount must be controlled not to form a resin gel, specifically at 10% by mol or less relative to 100% by mol of the total carboxylic acid component units.

Further, when an aliphatic polyfunctional carboxylic acid component is introduced, an aliphatic polyfunctional carboxylic acid having 4 to 20, preferably 6 to 12, more preferably 6 to 10 carbon atoms is used. As examples of such compounds, there may be mentioned adipic acid, suberic acid, azelaic acid, sebacic acid, decanedicarboxylic acid, undecanedicarboxylic acid, dodecanedicarboxylic acid, and the like. Among them, adipic acid is particularly preferable from a viewpoint of improved mechanical properties. Other than these compounds, a polyfunctional carboxylic acid having three or more functional groups is optionally used, but its added amount must be controlled not to form a resin gel, specifically at 10% by mol or less relative to 100% by mol of the total carboxylic acid component units.

Also in the present invention, when the total amount of polyfunctional carboxylic acid component unit is set 100% by mol, the content of a terephthalic acid component unit is 30 to 100% by mol, preferably 50 to 70% by mol, and more preferably 60 to 70% by mol, and the content of an aromatic polyfunctional carboxylic acid component unit other than terephthalic acid is 0 to 70% by mol, preferably 0 to 25% by mol, and more preferably 0 to 10% by mol. When the content of an aromatic polyfunctional carboxylic acid component is increased, moisture absorption tends to be decreased while reflow heat resistance tends to be increased. Especially, in a reflow soldering process using a lead-free solder, it is preferred that the content of a terephthalic acid component unit is 60% by mol or more. In addition, because crystallinity of a polyamide resin is increased as the content of an aromatic polyfunctional carboxylic acid component other than terephthalic acid is decreased, mechanical properties of its molded article, especially toughness tends to be increased. Further, the content of an aliphatic polyfunctional carboxylic acid component unit having 4 to 20 carbon atoms is 0 to 70% by mol, preferably 0 to 60% by mol, and more preferably 20 to 60% by mol.

[Polyfunctional Amine Component Unit (a-2)]

As a polyfunctional amine component unit (a-2) of a polyamide resin (A) of the present invention, there may be mentioned a linear or branched polyfunctional amine component unit having 4 to 25, preferably 4 to 8 carbon atoms, and more preferably a linear polyfunctional amine component unit having 4 to 8 carbon atoms, wherein the total amount of these polyfunctional amine component units is 100% by mol.

As specific examples of linear polyfunctional amine component units, there may be mentioned 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, and the like. Among them, 1,6-diaminohexane is preferable.

Also, as specific examples of linear aliphatic amine component unit having a branched chain, there may be mentioned 2-methyl-1,5-diaminopentane, 2-methyl-1,6-diaminohexane, 2-methyl-1,7-diaminoheptane, 2-methyl-1,8-diaminooctane, 2-methyl-1,9-diaminononane, 2-methyl-1,10-diaminodecane, 2-methyl-1,11-diaminoundecane, and the like. Among them, 2-methyl-1,5-diaminopentane and 2-methyl-1,8-diaminooctane are preferable.

As examples of alicyclic polyfunctional amine component units, there may be mentioned component units derived from such alicyclic diamines as 1,3-diaminocyclohexane, 1,4-diaminocyclohexane, 1,3-bis(aminomethyl)cyclohexane, 1,4-bis(aminomethyl)cyclohexane, isophorone diamine, piperazine, 2,5-dimethylpiperazine, bis(4-aminocyclohexyl)methane, bis(4-aminocyclohexyl)propane, 4,4'-diamino-3,3'-dimethyldicyclohexylpropane, 4,4'-diamino-3,3'-dimethyldicyclohexylmethane, 4,4'-diamino-3,3'-dimethyl-5,5'-dimethyldicyclohexylmethane, 4,4'-diamino-3,3'-dimethyl-5,5'-dimethyldicyclohexylpropane, α,α'-bis(4-aminocyclohexyl)-p-diisopropylbenzene, α,α'-bis(4-aminocyclohexyl)-m-diisopropylbenzene, α,α'-bis(4-aminocyclohexyl)-1,4-cyclohexane, α,α'-bis(4-aminocyclohexyl)-1,3-cyclohexane, and the like. Among these alicyclic diamine component units, 1,3-diaminocyclohexane, 1,4-diaminocyclohexane, bis(aminomethyl)cyclohexane, bis(4-aminocyclohexyl)methane, and 4,4'-diamino-3,3'-dimethyldicyclohexylmethane are preferable, and a component unit derived from alicyclic diamines such as 1,3-diaminocyclohexane, 1,4-diaminocyclohexane, bis(4-aminocyclohexyl)methane, 1,3-bis(aminocyclohexyl)methane, 1,3-bis(aminomethyl)cyclohexane, and the like is particularly preferable. When a polyfunctional compound having three or more functional groups is used, its added amount must be controlled not to form a resin gel, specifically at 10% by mol or less relative to 100% by mol of the total amine component units.

[Preparation of a Polyamide Resin (A)]

To prepare a polyamide resin (A) used in the present invention, any publicly known methods can be used. Generally, it is prepared by mixing the above-mentioned polyfunctional amine component and polyfunctional carboxylic acid component, and then heating them in the presence of a catalyst. Also, in this reaction, it is preferred that the total mol of the polyfunctional amine component exceeds that of the polyfunctional carboxylic acid component. Especially, it is preferred to use 100 to 120 equivalents of the total polyfunctional amine components relative to 100 equivalents of the total polyfunctional carboxylic acid components. This reaction is usually carried out under an inert gas atmosphere, wherein a gas in a reactor is generally replaced by such an inert gas as nitrogen gas. Further, in order to control a polycondensation reaction of a polyamide, it is preferred to add water in advance, wherein a water-soluble organic solvent, for example, such alcoholic solvents as methanol, ethanol, and the like may also be contained.

As a catalyst used to prepare a polyamide resin (A) of the present invention, phosphoric acid, its salts, and its esters; phosphorous acid, its salts, and its esters; and hypophosphorous acid, its salts, and its esters can be used. Among them, sodium phosphate, sodium phosphite, potassium hypophosphite, sodium hypophosphite, and the like, are preferred. These phosphorous compounds may be used singly or as a mixture thereof. These phosphorous compounds are used usually in the amount of 0.01 to 5 mol and preferably 0.05 to 2 mol, relative to 100 mol of the above-mentioned polyfunctional carboxylic acids.

In order to prepare a polyamide resin (A) used in the present invention, it is preferred to use an end-capper. As such end-cappers, benzoic acid, its alkaline metal salts, acetic acid, and the like, can be used. These end-cappers are used in the amount of usually 0.1 to 5 mol and preferably 0.5 to 2 mol relative to 100 mol of a polyfunctional carboxylic acid. By adjusting the amount of the end-capper used, an intrinsic viscosity [η] of a polycondensate obtained can be controlled.

The reaction conditions for preparing such a polycondensate are specifically as follows: the reaction temperature is usually 200 to 290° C. and preferably 220 to 280° C., and the reaction time is usually 0.5 to 5 hours and preferably 1 to 3 hours. Further, the reaction can be carried out under an atmospheric pressure or positive pressure, and it is preferred to carry out positive pressurized condition, usually under 2 to 5 MPa and preferably under 2.5 to 4 MPa.

By performing a polycondensation reaction in such a manner, a low condensate having an intrinsic viscosity [η] of usually 0.05 to 0.6 dl/g and preferably 0.08 to 0.3 dl/g as measured by an Ubbelohde viscometer in 96.5% sulfuric acid at 25° C. can be obtained. A polyamide low condensate thus formed in an aqueous medium is separated from a reaction solution. Separation of this polyamide low condensate from the reaction solution may be performed by using, for instance, such methods as filtration, centrifugal separation, and the like, but a solid-liquid separation by flushing the reaction solution containing a produced polyamide low condensate into air through a nozzle can be carried out efficiently.

In a preferred embodiment of a preparation method of a polyamide resin used in the present invention, a polyamide low condensate thus obtained is further subjected to a post-polymerization. This postpolymerization is preferably performed by drying the above-mentioned polyamide low condensate then heating it in a molten state under a shear stress. In this reaction, a dried polyamide low condensate is heated at least to its melting temperature. Generally, it is heated at the melting point or above of a dried polyamide low condensate, preferably higher than its melting point by 10 to 60° C. A shear stress can be applied to the molten material by using, for example, a twin-screw extruder equipped with a vent, a kneader, and the like. By applying a shear stress to a molten material in this way, it is assumed that a dried polyamide low condensate undergoes polycondensation with each other, and at the same time a polycondensation reaction of a condensate proceeds as well.

In another preferred embodiment of a preparation method of a polyamide resin used in the present invention, a polyamide low condensate thus obtained is further subjected to a solid phase polymerization. Namely, a polyamide having an intrinsic viscosity [η] of 0.5 to 1.2 dl/g as measured in the above-mentioned manner can be obtained by a solid phase polymerization of a polyamide low condensate thus obtained in a publicly known or a publicly used method.

In another preferred embodiment of a preparation method of a polyamide resin used in the present invention, a polyamide low condensate thus obtained is further subjected to a melt polymerization after a solid phase polymerization. Namely, a polyamide having an intrinsic viscosity [η] of 0.5 to 1.2 dl/g as measured in the above-mentioned manner can be obtained by a solid phase polymerization of a polyamide low condensate in a publicly known or publicly used method followed by a melt polymerization.

A polyamide resin (A) of the present invention has an intrinsic viscosity [η] of 0.5 to 1.2 dl/g, preferably 0.5 to 0.9 dl/g, and more preferably 0.7 to 0.85 dl/g as measured in 96.5% sulfuric acid at 25° C. When [η] is in this range, a polyamide resin having good flowability and toughness can be obtained. Further, the lower the [η] is within the above range, the better the dispersibility of a flame retardant in a polyamide resin after melt-kneading is, thus a molded article obtained therefrom tends to be better in toughness and incombustibility.

A polyamide resin (A) used in the present invention is crystalline, and thus has its melting point. When a melting point (Tm) is measured as an endothermic peak based on melting upon heating at 10° C./minute by using a differential scanning calorimeter (DSC), a melting point of a polyamide resin obtained by the above-mentioned preparation method is 280 to 340° C., preferably 300 to 340° C., more preferably 310 to 335° C., and further preferably 315 to 330° C. A polyamide resin having a melting point in the above-mentioned range has extraordinarily high heat resistance. Further, a polyamide resin having a melting point of 280° C. or above, further 300° C. or above, especially in the range of 320 and 330° C., shows sufficient heat resistance in a lead-free reflow soldering process, especially when a lead-free reflow solder having a high melting point is used. On the other hand, when its melting point is 340° C. or below, because it is below 350° C., that is the decomposition temperature of a polyamide resin, there is no foaming, gas generation, or discoloration of a molded article and the like due to decomposition of a polyamide resin during molding, thus a sufficient heat resistance can be attained.

[Flame Retardant (B)]

A flame retardant (B) used in the present invention is added for a purpose of decreasing flammability of a resin. In order to impart heat stability during molding at 300° C. or above, incombustibility, flowability, heat resistance sustainable at reflow temperature during a lead-free soldering process, same or higher toughness as compared to 46-nylon, and heat stability during molding to a flame-retardant polyamide composition of the present invention, it is necessary to use a brominated polystyrene with a specific bromine content and a specific molecular weight.

A brominated polystyrene used in the present invention is the one prepared by brominating polystyrene or poly(α-methylstyrene). In a brominated polystyrene obtained by polymerizing styrene or α-methylstyrene followed by bromination, some of hydrogen atoms bonded to carbon atoms constituting the aromatic ring are replaced by bromine atoms, but there is also a case in which some of hydrogen atoms bonded to the main alkyl chain are replaced by bromine atoms depending on a preparation method. In the present invention, it is necessary to use a brominated polystyrene of the type in which some of hydrogen atoms bonded to carbon atoms of the aromatic ring are replaced by bromine atoms, wherein hydrogen atoms bonded to the main alkyl chain of the polymer are not substantially replaced by bromine atoms, and at the same time in which the content of bromine is 65 to 71% by mass and preferably 67 to 71% by mass.

Further, that hydrogen atoms bonded to the main alkyl chain of the polymer are not substantially replaced by bromine atoms means that the ratio of the replacement of hydrogen atoms bonded to the main alkyl chain with bromine atoms is 0 to 0.5% by mass, preferably 0 to 0.2% by mass, and more preferably 0 to 0.1% by mass. A brominated polystyrene of this type is excellent in heat stability, and a flame-retardant polyamide composition obtained therefrom also is improved in its heat stability. Heat stability of such a flame retardant can be assessed by generation of hydrogen bromide gas upon its heating, namely, the smaller the generated gas is, the better the heat stability is.

On the other hand, other than the above-mentioned flame retardants, there may be mentioned poly(brominated styrene) obtained by polymerization of brominated styrene as a publicly known material, though a highly brominated compound containing 67% by mass or more of bromine is difficult to prepare and also extremely difficult to obtain. Therefore, it is difficult to obtain a flame-retardant polyamide composition thereof and a molded article having high toughness without impairing incombustibility by using such a composition. In addition, because poly(brominated styrene) contains residual brominated styrene monomer or oligomers of a low degree of polymerization, it is poor in heat stability during continuous molding for long operation time.

Further, as another characteristic of the present invention, there may be mentioned high flowability during molding without impairing physical properties such as the above-mentioned incombustibility, heat-resistance, toughness, and the like. In order to obtain a flame-retardant polyamide composition having high flowability, it is necessary to use a brominated polystyrene having a specific molecular weight. Specifically, a molecular weight of a brominated polystyrene in terms of polystyrene as measured by gel permeation chromatography (GPC) is 1000 to 4800 and preferably 2000 to 4500 as the weight-average molecular weight (Mw). Also, its melt flow rate (MFR) is 200 to 1000 g/10-minutes and preferably 400 to 900 g/10-minutes. Here, the weight-average molecular weight is the value in terms of polystyrene, obtained by GPC which uses a differential refractometer detector and chloroform as a mobile phase at the column temperature of 40° C. And, MFR is the value obtained by measurement under the conditions of a load of 1200 g, a temperature of 270° C., and an orifice inner diameter of 2.095 mm. MFR can also be measured under the conditions of a load of 2160 g, a temperature of 220° C., and an orifice inner diameter of 2.095 mm. Under such conditions, MFR is 4 to 15 g/10 minutes.

Further, as to the molecular weight, the one with the weight-average molecular weight being in the above-mentioned range, the number-average molecular weight (Mn) being 800 to 4800, and the molecular weight distribution (Mw/Mn) being 1.05 to 1.25 is preferred. By satisfying the above-mentioned average molecular weight and molecular weight distribution, it is possible to attain high flowability during molding of the obtained flame-retardant composition and higher starting temperature of weight loss (high heat stability) during heating. When the molecular weight of a brominated polystyrene is the same as or above the lower limit of the above mentioned range, namely, MFR is the same as or below the upper limit, sufficient incombustibility and toughness can be imparted to an article obtained by molding a flame-retardant polyamide resin composition of the present invention. Further, when the molecular weight is the same as or below the upper limit of the above-mentioned range, namely, MFR is the same as or above the lower limit, good flowability during molding can be attained without impairing toughness of a molded article, and thus they are preferable.

A brominated polystyrene that is a flame retardant (B) used in the present invention is easily available in the market, and there may be mentioned, for example, SAYTEX HP-3010, SAYTEX HP-3010G, SAYTEX HP-3010P, and the like, all of which are manufactured by Albemarle Corporation.

[Flame Retardant Auxiliary Agent (C)]

Any publicly known flame retardant auxiliary agent (C) can be used as far as it can highly enhance a function of incombustibility by using in combination with a flame retardant (B). As specific examples, there may be mentioned antimony compounds such as antimony trioxide, antimony tetroxide, antimony pentoxide, sodium antimonate, and the like, zinc borate such as $2ZnO.3B_2O_3$, $4ZnO.B_2O_3.H_2O$, $2ZnO.3B_2O_3.3.5H_2O$, and the like, zinc stannate, zinc phosphate, calcium borate, calcium molybdate, and others. They may be used singly or in a combination of two kinds or more. Among them, sodium antimonate, zinc borate, and zinc phosphate are preferred, while sodium antimonate and anhydrous zinc borate, that is, $2ZnO.3B_2O_3$ are more preferred.

Further, a flame retardant auxiliary agent (C) used in the present invention is added in the amount of 0.5 to 10% by mass, preferably 0.5 to 5% by mass, and more preferably 1 to 4% by mass, relative to the total 100% by mass of a polyamide resin (A), a flame retardant (B), a flame retardant auxiliary agent (C), and a reinforcing material (D).

[Reinforcing Material (D)]

In the present invention, a reinforcing material (D) can be optionally used. As a reinforcing material, various inorganic filler materials in the forms of fiber, powder, particle, flake, needle, cloth, mat, and the like can be used. More particularly, inorganic compounds in the form of powder or flake, such as silica, silica-alumina, alumina, calcium carbonate, titanium dioxide, talc, wollastonite, diatom earth, clay, kaolin, spherical glass, mica, gypsum, red iron oxide, magnesium oxide, zinc oxide, and the like, inorganic compounds in the form of needle such as potassium titanate and the like, inorganic fibers such as glass fibers, potassium titanate fibers, metal-coated glass fibers, ceramic fibers, wollastonite, carbon fibers, metal carbide fibers, metal hardened fibers, asbestos fibers, boron fibers, and the like, and further organic fibers such as aramid fibers, carbon fibers, and the like, can be mentioned. As such filler materials in a fiber form, glass fibers are particularly preferred. By using glass fibers, moldability of the composition is improved, and at the same time, mechanical properties such as tensile strength, flexural strength, flexural modulus, and the like, and heat resistant properties such as heat-distortion temperature and the like, of a molded article prepared from the polyamide composition are improved. An average length of the above mentioned glass fibers is usually 0.1 to 20 mm and preferably 0.3 to 6 mm, while an aspect ratio (L/D, L: average length of fibers, D: average outer diameter of fibers) is usually 10 to 5000 and preferably 2000 to 3000. It is preferred to use glass fibers having average length and aspect ratio within the above-mentioned range.

These fillers may also be used in a combination of two kinds or more. Further, these fillers may be used after being treated with a silane coupling agent or a titanium coupling agent. For example, they may be surface treated with a silane compound such as vinyl triethoxysilane, 2-aminopropyl triethoxysilane, 2-glycidoxypropyl triethoxysilane, and the like.

Further, a fibrous filler material of a reinforcing material (D) of the present invention may be coated with a binder, wherein such binders as acryl, acryl/maleic acid modified, epoxy, urethane, urethane/maleic acid modified, urethane/amine modified compounds, and the like, are preferably used. The above-mentioned surface modifiers may be used together with the above-mentioned binders. By concomitant usage, binding of a fibrous filler material in a composition of the present invention with other component in the composition is increased, and thus appearance and mechanical properties are improved.

[Hydrotalcite Compound (E)]

In the present invention, a hydrotalcite compound is used as a heat stabilizer, and thus, discoloration and carbonization of a flame-retardant polyamide composition are suppressed by capturing bromine groups that are eliminated from a flame retardant. A particularly preferred hydrotalcite compound in the present invention is represented by the following chemical formula (1).

$$Mg_{1-x}Al_x(OH)_2(A)^{n-}{}_p mH_2O \quad (1)$$

Here, $0.27 \leqq x \leqq 0.35$, p=x/n, A: an anion with n-valency, and m=0 to 0.7. As a metal element, a type of Mg/Al is essential, wherein the Mg/Al ratio is 0.65/0.35 to 0.73/0.27 and preferably 0.67/0.33 to 0.70/0.30. By satisfying the above-mentioned range, generation of bromine gas and formation of discolored and carbonized substances can be suppressed in high efficiency.

As examples of anionic species A, $OH^-$, $CO_3^{2-}$, $SO_4^{2-}$, and the like, can be used, though $CO_3^{2-}$ is preferred. Further, crystal water between layers of a hydrotalcite compound may not be contained, though, if contained, its number (m in the formula (1)) is preferably 0.3<m<0.7 and more preferably 0.4<m<0.6. The one without containing crystal water is inferior to the one with containing crystal water in capturing eliminated bromine groups, and thus generation of bromine gas and formation of discolored and carbonized substances tend to be increased. Further, if the value of m exceeds the above-mentioned range, heat resistance (blister resistance) in the reflow soldering process tends to be decreased.

A BET specific surface area of pulverized particles of a hydrotalcite compound of the present invention is preferably 7 to 30 $m^2$ and more preferably 7 to 15 $m^2$, and its powder pH is 7.5 to 9.5 and preferably 7.5 to 9.0.

Further, in order to improve dispersibility of the above-mentioned hydrotalcite, its powder surface is preferably coated. As examples of such coating materials, higher aliphatic acid compounds such as sodium stearate, sodium laurate, sodium oleate, and the like, and silane compounds such as decyl trimethoxysilane, γ-aminopropyl triethoxysilane, γ-aminopropyl trimethoxysilane, and the like are mentioned. Among them, sodium stearate, sodium laurate, and sodium oleate are more preferable.

[Other Additives]

A flame-retardant polyamide composition of the present composition may contain, in addition to the above-mentioned components, various kinds of publicly known additives such as a heat stabilizer, a weatherability stabilizer, a flow improver, a plasticizer, a thickener, an anti-static agent, a mold-releasing agent, a pigment, a dye, an inorganic or organic filler, a nucleating agent, a reinforcing fiber material, carbon black, an inorganic material such as carbon black, talc, clay, mica, and the like, within such an amount as not to impair the purpose of the present invention. Specifically, by adding a reinforcing fiber material among the above-mentioned additives, a flame-retardant polyamide composition of the present invention is further improved in heat resistance, incombustibility, rigidity, tensile strength, flexural strength, and impact strength.

Further, a flame-retardant polyamide composition of the present invention may contain other polymers in such a range as not to impair the purpose of the present invention. As examples of such other polymers, there may be mentioned such polyolefins as polyethylene, polypropylene, poly(4-methyl-1-pentene), ethylene-1-butene copolymer, propylene-ethylene copolymer, propylene-1-butene copolymer, polyolefin elastomer, and the like, polystyrene, polyamide, polycarbonate, polyacetal, polysulfone, polyphenylene oxide, a fluorine-containing resin, a silicone resin, PPS, LCP, Teflon (registered trade mark), and others. Other than the above-mentioned polymers, there may be mentioned a modified polyolefin, specifically polyethylene modified with a carboxyl group, an acid anhydride group, an amino group, and the like, a modified aromatic vinyl compound/conjugated diene copolymer or its hydrogenated compound such as modified SEBS and the like, a modified polyolefin elastomer such as modified ethylene/propylene copolymer and the like.

[Preparation Method of a Flame-retardant Polyamide Composition]

To prepare a flame-retardant polyamide composition of the present invention, any of publicly known resin kneading methods can be used. For example, a method for mixing each component by using a Henschel mixer, a V-blender, a ribbon blender, a tumbler blender, and the like, or a method in which they are melt-kneaded, after being mixed, by a single-screw extruder, a multi-screw extruder, a kneader, a Banbury mixer, and the like, and further granulated and pulverized thereafter, can be used.

[Flame-retardant Polyamide Composition]

A flame-retardant polyamide composition of the present invention contains a polyamide resin (A) in the amount of 20 to 80% by mass, preferably 40 to 60% by mass, and more preferably 40 to 50% by mass, relative to the total 100% by mass of a polyamide resin (A), a flame retardant (B), a flame retardant auxiliary agent (C), a reinforcing material (D), and a hydrotalcite compound (E). When the content of a polyamide resin (A) in the flame-retardant polyamide composition is 20% by mass or more, sufficiently high toughness can be attained, while, when 80% by mass or less, incombustibility can be attained since it can contain sufficient amounts of a flame retardant and a flame retardant auxiliary agent.

Further, a flame retardant (B) is contained in the amount of 5 to 40% by mass, preferably 10 to 30% by mass, and more preferably 17 to 25% by mass. When the content of the flame retardant (B) in a flame-retardant polyamide composition is 5% by mass or more, sufficient incombustibility can be attained, while, when 40% by mass or less, it is preferable since such properties as toughness of a molded article are not decreased.

Also, a flame retardant auxiliary agent (C) is contained in the amount of 0.5 to 10% by mass, preferably 0.5 to 5% by mass, and more preferably 1 to 4% by mass. When the content of the flame retardant auxiliary agent (C) in a flame-retardant polyamide composition is 0.5% by mass or more, it is possible to impart good incombustibility to the polyamide resin, while, when the content is 10% by mass or less, there is no gas generation nor increase of a discolored material during a melt molding, and in addition, its toughness is not decreased, and thus preferable.

In addition, a reinforcing material (D) is contained in the amount of 0 to 60% by mass, preferably 10 to 50% by mass, and more preferably 20 to 45% by mass. By blending a reinforcing material, rigidity can be imparted to the flame-retardant polyamide composition. Further, the content of the reinforcing material (D) in a flame-retardant polyamide composition is preferably 60% by mass or less, since surface appearance of a molded article is not deteriorated, though depending on a shape of the objective molded article.

Furthermore, a hydrotalcite compound (E) is contained in the amount of 0.05 to 0.4% by mass and preferably 0.1 to 0.3% by mass. When the content is 0.05% by mass or more, formation of a discolored and carbonized material during molding tends to be decreased, and when 0.4% by mass or less, good heat resistance, namely blister resistance, is attained in a reflow soldering process, and thus preferred.

In addition, a flame-retardant polyamide composition of the present invention can contain the above-mentioned "other additives" within such an amount as not to impair the purpose of the present invention.

A flame-retardant polyamide composition of the present invention is the one satisfying the flame retardant criteria of V-0 by UL 94 standard, and its reflow heat resistance temperature after being moisturized at a temperature of 40° C. and a relative humidity of 95% for 96 hours is 250 to 280° C., preferably 255 to 280° C., more preferably 260 to 280° C., and further preferably 265 to 270° C. Mechanical properties, namely the fracture energy as an indicator of toughness, is 50 to 70 mJ and preferably 53 to 70 mJ. A flow length as measured by injection molding of a resin into a bar-flow mold is 55 to 90 mm, preferably 60 to 80 mm, and more preferably 65 to 75 mm, which imparts extremely excellent characteristics to the resin composition, thus providing a material, especially useful for an electric and electronic part having excellent heat resistance as required for a surface mounting using a lead-free solder, same or higher toughness as compared with 46-nylon, and high melt flowability, incombustibility, and molding stability.

[Molded Articles and Materials for Electric and Electronic Parts]

A flame-retardant polyamide composition of the present invention can be molded into various articles by using publicly known methods such as a press molding, an injection molding, an extrusion molding, and the like.

A flame-retardant polyamide composition of the present invention is excellent in molding stability, heat resistance, and mechanical properties, and thus can be used in the field where these properties are required or in a precision molding field. As specific uses, there may be mentioned various kinds of molded articles, namely an electric component for automobile, an electric and electronic part such as a current limiter, a connector, an LED reflector material, and the like, a coil bobbin, a housing, and others.

EXAMPLES

In the following, the present invention is explained more specifically by Examples, but the present invention is not restricted to these Examples. In Examples and Comparative Examples, measurement and evaluation of each of properties were performed according to the following methods.

[Intrinsic Viscosity [η]]

In accordance with JIS K6810-1977, 0.5 g of a polyamide resin was dissolved in 50 ml of 96.5% sulfuric acid, and then the falling time of the sample solution at 25±0.05° C. was measured by using an Ubbelohde viscometer. Intrinsic viscosity was calculated by the following equation.

$$[\eta]=\eta SP/[C(1+0.205\eta SP)],\eta SP=(t-t0)/t0$$

[η]: intrinsic viscosity (dl/g), ηSP: specific viscosity, C: sample concentration (g/dl), t: falling time (second) of sample solution, t0: falling time (second) of blank sulfuric acid.

[Melting Point (TM)]

By using DSC7 manufactured by PerkinElmer Inc., a sample was once kept at 330° C. for 5 minutes, cooled to 23° C. at the cooling rate of 10° C./minute, and then heated at the heating rate of 10° C./minute. An endothermic peak based on melting in the procedure was designated as its melting point.

[Flammability Test]

Incombustibility was evaluated by a vertical flammability test by using a specimen with a size of 1/32 inch×1/2 inch×5 inch that had been obtained by injection molding in accordance with a UL 94 standard (UL Test No. UL94, dated Jun. 18, 1991).

Further, incombustibility was judged to be better when the total time of flaming combustion after the end of flame application was shorter for five specimens with two testings each, namely a total of ten tests, which is one criterion of the UL94 V-0 rating. Meanwhile, in order to meet the UL94 V-0 rating, the total time of flaming combustion needs to be 50 seconds or less.

A molding machine: Tuparl TR40S3A, manufactured by Sodik Plustech, Co., Ltd., temperature of a molding machine cylinder: 10° C. above melting point of each polyamide resin, and temperature of a mold: 120° C.

[Reflow Heat Resistance Test]

A test specimen with 64 mm length, 6 mm width, 0.8 mm thickness, obtained by injection molding was moisturized at 40° C. and relative humidity of 95% for 96 hours.

A molding machine: Tuparl TR40S3A, manufactured by Sodik Plustech, Co., Ltd., temperature of a molding machine cylinder: 10° C. above melting point of each polyamide resin, and temperature of a mold: 100° C.

A reflow process was performed in a temperature profile shown in FIG. 1 by using an air reflow soldering equipment (AIS-20-82-C, manufactured by Eightech Tectron Co., Ltd.).

That is to say, a test specimen after subjected to the above-mentioned moisturization was placed on a glass epoxy substrate with 1 mm thickness, and then a profile was measured by placing a temperature sensor on it. In FIG. 1, after the sample was heated to 230° C. at a given heating rate, it was further heated to the prescribed temperature (a: 270° C., b: 265° C., c: 260° C., d: 255° C., e: 235° C.) in 20 seconds, and then cooled to 230° C. A maximum value of the set temperature at which the test specimen was not molten and yet did not form a blister on the surface was determined as a reflow heat resistance temperature. In general, a reflow heat resistance temperature of a moisturized test specimen tends to be lower as compared with an absolute dry test specimen. Also, as the mass ratio of polyamide/flame retardant is lower, a reflow heat resistance temperature tends to be lower.

[Flexural Test]

A test specimen with 64 mm length, 6 mm width, and 0.8 mm thickness obtained by injection molding was allowed to stand under a nitrogen atmosphere at 23° C. for 24 hours. Then, it was subjected to flexural test using a flexural tester AB5, manufactured by NTESCO Co., Ltd., with a span of 26 mm and flexural rate of 5 mm/minute at 23° C. and 50% relative humidity to measure flexural strength, distortion distance, flexural modulus, and energy for sample breaking (namely toughness). A molding machine: Tuparl TR40S3A, manufactured by Sodik Plustech, Co., Ltd., temperature of a molding machine cylinder: 10° C. above melting point of each polyamide resin, and temperature of a mold: 100° C.

[Flow Length Test (Flowability)]

A flow length (mm) of a resin in a mold was measured by carrying out injection molding with the use of a bar-flow mold having 10 mm width and 0.5 mm thickness under the following conditions.

An injection molding machine: Tuparl TR40S3A, manufactured by Sodik Plustech, Co., Ltd.

Set injection pressure: 2000 kg/cm$^2$, set temperature of a molding machine cylinder: 10° C. above melting point of each polyamide resin, and temperature of a mold: 120° C.

[Residence Stability Test]

A flame-retardant polyamide composition was kept in a molding machine under the conditions of a cylinder temperature of 330° C. in a unit time of 60 seconds, and then injected into the mold to obtain the above-mentioned test specimen for flexural test. A residence time when a discolored or black carbonized material was observed in the obtained article was recorded.

A molding machine: Tuparl TR40S3A, manufactured by Sodik Plustech, Co., Ltd., temperature of a molding machine cylinder: 330° C., and temperature of a mold: 100° C.

[Measurement of Quantity of Generated Bromine Gas]

Under argon gas atmosphere, 1.0 g of a flame-retardant polyamide composition was heated by using a hot gas generating equipment in a sealed quartz cylinder at 330° C. for 30 minutes. The generated gas was trapped in an aqueous hydrazine solution and then the quantity of generated bromine gas was measured by ion chromatography.

[Measurement of Weight Loss by Heating]

Under the following conditions, 15 mg of a flame-retardant polyamide composition was heated and then the temperature at which weight loss started was recorded.

Equipment: EXSTAR TG/DTA6200

Heating rate: 20° C./minute under nitrogen stream (300/minute)

In Examples and Comparative Examples, the following components were used for a polyamide resin (A), a flame retardant (B), a flame retardant auxiliary agent (C), a reinforcing material (D), and a hydrotalcite compound (E).

[Polyamide Resin (A)]

(Polyamide Resin (A-1))

Constitution: dicarboxylic acid component unit (terephthalic acid: 62.5% by mol, adipic acid: 37.5% by mol) and diamine component unit (1,6-diaminohexane: 100% by mol)

Intrinsic viscosity [η]: 0.81 dl/g

Melting point: 320° C.

(Polyamide Resin (A-2))

Constitution: dicarboxylic acid component unit (terephthalic acid: 62.5% by mol, adipic acid: 37.5% by mol) and diamine component unit (1,6-diaminohexane: 100% by mol)

Intrinsic viscosity [η]: 1.0 dl/g

Melting point: 320° C.

(Polyamide Resin (A-3))

Constitution: dicarboxylic acid component unit (terephthalic acid: 55% by mol, adipic acid: 45% by mol) and diamine component unit (1,6-diaminohexane: 100% by mol)

Intrinsic viscosity [η]: 0.8 dl/g

Melting point: 310° C.

(Polyamide Resin (A-4))

Constitution: dicarboxylic acid component unit (terephthalic acid: 100% by mol) and diamine component unit (1,9-nonandiamine: 82% by mol, 2-methyl-1,8-octanediamine: 18% by mol)

Intrinsic viscosity [η]: 1.0 dl/g

Melting point: 305° C.

[Flame Retardant (B)]

The number-average molecular weight and MFR of each flame retardant were measured under the following conditions.

(Average Molecular Weight)

Average molecular weight was measured under the following conditions by using a gel permeation chromatography (GPC).

Measurement equipment: Shodex GPC SYSTEM-21

Column: Shodex GPC K-G+K-806L+K-806L

Column temperature: 40° C., mobile phase: chloroform, and a detector: differential refractometer Flow rate: 1.0 ml/minute Average molecular weight: in terms of polystyrene (MFR)

Measurement equipment: automatic extrusion-type plastometer

Orifice inner diameter: 2.095 mm, load: 1200 g, and temperature: 270° C.

Orifice inner diameter: 2.095 mm, load: 2160 g, and temperature: 220° C.

(Flame Retardant (B-1))

Brominated polystyrene: HP-3010-1, manufactured by Albemarle Corporation

Bromine content: 68% by mass

Number-average molecular weight (Mn): 3400, weight-average molecular weight (Mw): 4000

Mw/Mn: 1.2

MFR: 490 g/10 minutes (temperature 270° C., load 1200 g)

MFR: 6 g/10 minutes (temperature 220° C., load 2160 g)

(Flame Retardant (B-2))

Brominated polystyrene: HP-3010-2, manufactured by Albemarle Corporation

Bromine content: 68% by mass

Number-average molecular weight (Mn): 2800, weight-average molecular weight (Mw): 3200

Mw/Mn: 1.2

MFR: 780 g/10 minutes (temperature 270° C., load 1200 g)

MFR: 11 g/10 minutes (temperature 220° C., load 2160 g)

(Flame Retardant (B-3))

Brominated polystyrene: PRF-1200ZEX, manufactured by MANAC Inc.

Bromine content: 68% by mass

Number-average molecular weight (Mn): 15500, weight-average molecular weight (Mw): 122000

Mw/Mn: 7.9

MFR: 3 g/10 minutes (temperature 270° C., load 1200 g)

(Flame Retardant (B-4))

Polybrominated styrene: PBS64-HW, manufactured by GLC K.K.

Bromine content: 64% by mass

Number-average molecular weight (Mn): 4900, weight-average molecular weight (Mw): 24000

Mw/Mn: 5.0

MFR: 60 g/10 minutes (temperature 270° C., load 1200 g)

(Flame Retardant (B-5))

Polybrominated styrene: PDBS-80, manufactured by GLC K.K.

Bromine content: 60% by mass

Number-average molecular weight (Mn): 4900, weight-average molecular weight (Mw): 24000

Mw/Mn: 5.0

MFR: 115 g/10 minutes (temperature 270° C., load 1200 g)

[Flame Retardant Auxiliary Agent (C)]

(Flame Retardant Auxiliary Agent (C-1))

Sodium antimonate: SA-A, manufactured by Nihon Seiko Co., Ltd.

(Flame Retardant Auxiliary Agent (C-2))

Zinc borate: FIREBREAK 500 ($2ZnO.3B_2O_3$), manufactured by Borax Inc.

[Reinforcing Material (D)]

Glass fibers: ECS03-615, manufactured by Central Glass Co., Ltd.

[Hydrotalcite Compound (E)]

Hydrotalcite compounds (E-1) to (E-6) having structures as shown in Table 1 were used.

TABLE 1

| | $Mg_{1-x}Zn_yAl_x(OH)_2(A)^{n-}_p mH_2O$ | | | | | |
|---|---|---|---|---|---|---|
| Hydrotalcites | E-1 | E-2 | E-3 | E-4 | E-5 | E-6 |
| Mg | 0.69 | 0.75 | 0.58 | 0.68 | 0.69 | 0.69 |
| Zn | 0 | 0 | 0.09 | 0 | 0 | 0 |
| Al | 0.31 | 0.25 | 0.33 | 0.32 | 0.31 | 0.31 |
| A | $CO_3$ | $CO_3$ | $CO_3$ | $CO_3$ | $CO_3$ | $CO_3$ |
| P | 0.16 | 0.13 | 0.17 | 0.16 | 0.16 | 0.16 |
| m | 0.5 | 0.5 | 0.5 | 0 | 0.8 | 0.5 |
| Surface treatment (sodium stearate) | Yes | Yes | Yes | Yes | No | No |

Other than the above-mentioned compounds, in order to prevent the resin from dripping by melting and liquefying when burning, 1.4% by mass of maleated SEBS (trade name: Toughteck M1913, manufactured by Asahi Chemical Industry Co., Ltd.) as a dripping preventing agent, 0.3% by mass of wax (trade name: Hostamont CAV102, manufactured by Clariant Japan K.K.), and 0.7% by mass of talc (trade name: Hifiller #100 Clay 95, manufactured by Matsumura Sangyo Co., Ltd.) were added relative to the total 100% by mass of a polyamide resin (A), a flame retardant (B), a flame retardant auxiliary agent (C), a reinforcing material (D), a hydrotalcite compound (E), maleated SEBS, wax, and talc.

Examples 1 to 8 and Comparative Examples 1 to 5

The above-mentioned each component was mixed in the ratio shown in Tables 2 and 3, and the mixture was charged into a twin-screw extruder equipped with a vent set at 320° C. to obtain a composition in pellets by melt-kneading. Properties of the obtained flame-retardant polyamide composition are shown in Tables 2 and 3. As a reference, evaluation results of 46-nylon (trade name: Stanyl TS250F6D, manufactured by DSM), a commercially available flame retardant polyamide with high toughness, are shown as Comparative Example 5 in Table 3.

TABLE 2

| | | | Examples | | | | | | | |
|---|---|---|---|---|---|---|---|---|---|---|
| | | Unit | 1 | 2 | 3 | 4 | 5 | 6 | 7 | 8 |
| Polyamide resin (A) | Kinds | — | A-1 | A-1 | A-1 | A-2 | A-3 | A-1 | A-1 | A-4 |
| | Amount | % by mass | 49.3 | 47.3 | 45.3 | 47.3 | 47.3 | 47.3 | 45.3 | 47.3 |
| | Intrinsic viscosity [η] | dl/g | 0.8 | 0.8 | 0.8 | 1.0 | 0.8 | 0.8 | 0.8 | 1.0 |
| Flame retardant (B) | Kinds | — | B-1 | B-1 | B-1 | B-1 | B-1 | B-2 | B-1 | B-1 |
| | Amount | % by mass | 16 | 18 | 20 | 18 | 18 | 18 | 19 | 18 |
| | MFR(270° C./1200 g) | g/10 minutes | 490 | 490 | 490 | 490 | 490 | 780 | 490 | 490 |
| Flame retardant auxiliary agent (C) | Kinds | — | C-1 | C-1 | C-1 | C-1 | C-1 | C-1 | C-1/C-2 | C-1 |
| | Amount | % by mass | 2.0 | 2.0 | 2.0 | 2.0 | 2.0 | 2.0 | 0.4/2.6 | 2.0 |
| Reinforcing material (D) | Amount | % by mass | 30 | 30 | 30 | 30 | 30 | 30 | 30 | 30 |
| Hydrotalcite compound (E) | Kinds | — | E-4 | E-4 | E-4 | E-4 | E-4 | E-4 | E-4 | E-4 |
| | Amount | % by mass | 0.3 | 0.3 | 0.3 | 0.3 | 0.3 | 0.3 | 0.3 | 0.3 |
| Flammability test | UL 94 rating | — | V-0 | V-0 | V-0 | V-0 | V-0 | V-0 | V-0 | V-0 |
| | Total time of flaming combustion | Seconds | 28 | 3 | 2 | 15 | 5 | 4 | 10 | 18 |
| Flexural test | Strength | MPa | 287 | 285 | 282 | 260 | 271 | 283 | 283 | 260 |
| | Distortion distance | mm | 4.2 | 4.0 | 3.8 | 3.8 | 4.0 | 4.0 | 3.8 | 3.5 |
| | Flexural modulus | MPa | 12500 | 12700 | 12800 | 12400 | 12000 | 12700 | 12900 | 12300 |
| | Toughness | mJ | 65 | 63 | 60 | 57 | 62 | 62 | 61 | 52 |
| Reflow heat resistance temperature | | ° C. | 270 | 265 | 265 | 270 | 255 | 265 | 265 | 270 |
| Flow length | | mm | 67 | 70 | 73 | 60 | 70 | 72 | 73 | 61 |
| Residence stability | | Seconds | 540 | 540 | 540 | 540 | 600 | 540 | >600 | 540 |
| Quantity of generated bromine gas | | ppm | — | 1500 | — | — | 1500 | — | <1 | — |
| Starting temperature of weight loss by heating | | ° C. | — | 396 | — | — | — | — | 403 | — |

TABLE 3

| | | | Comparative Examples | | | | |
|---|---|---|---|---|---|---|---|
| | | Unit | 1 | 2 | 3 | 4 | 5 |
| Polyamide resin (A) | Kinds | — | A-1 | A-1 | A-1 | A-1 | TS250 F6D |
| | Amount | % by mass | 47.3 | 46.3 | 44.3 | 43.3 | |
| | Intrinsic viscosity [η] | dl/g | 0.8 | 0.8 | 0.8 | 0.8 | |
| Flame retardant (B) | Kinds | — | B-3 | B-4 | B-4 | B-5 | |
| | Amount | % by mass | 18 | 19 | 21 | 22 | |
| | MFR(270° C./1200 g) | g/10 minutes | 3 | 60 | 60 | 115 | |
| Flame retardant auxiliary agent (C) | Kinds | — | C-1 | C-1 | C-1 | C-1 | |
| | Amount | % by mass | 2.0 | 2.0 | 2.0 | 2.0 | |

TABLE 3-continued

| | | Unit | Comparative Examples 1 | 2 | 3 | 4 | 5 |
|---|---|---|---|---|---|---|---|
| Reinforcing material (D) | Amount | % by mass | 30 | 30 | 30 | 30 | |
| Hydrotalcite compound (E) | Kinds | — | E-4 | E-4 | E-4 | E-4 | |
| | Amount | % by mass | 0.3 | 0.3 | 0.3 | 0.3 | |
| Flammability test | UL 94 rating | — | V-0 | V-0 | V-0 | V-0 | V-0 |
| | Total time of flaming combustion | Seconds | 5 | 33 | 5 | 35 | — |
| Flexural test | Strength | MPa | 285 | 283 | 270 | 267 | 254 |
| | Distortion distance | mm | 3.9 | 3.7 | 3.5 | 3.5 | 3.9 |
| | Flexural modulus | MPa | 12700 | 12500 | 12700 | 12600 | 11900 |
| | Toughness | mJ | 60 | 57 | 53 | 50 | 59 |
| Reflow heat resistance temperature | | ° C. | 265 | 265 | 260 | 260 | ≦235 |
| Flow length | | mm | 40 | 59 | 63 | 65 | 50 |
| Residence stability | | Seconds | 300 | 420 | 420 | 420 | — |
| Quantity of generated bromine gas | | ppm | — | 1900 | — | — | |
| Starting temperature of weight loss by heating | | ° C. | — | — | 383 | — | — |

Examples 9 to 13

The above-mentioned each component was mixed in the ratio shown in Table 4, and the mixture was charged into a twin-screw extruder equipped with a vent set at 320° C. to obtain a composition in pellets by melt-kneading. Properties of the obtained flame-retardant polyamide composition are shown in Table 4.

TABLE 4

| | | Unit | Examples 9 | 10 | 11 | 12 | 13 |
|---|---|---|---|---|---|---|---|
| Polyamide resin (A) | Kinds | — | A-1 | A-1 | A-1 | A-2 | A-3 |
| | Amount | % by mass | 47.4 | 47.5 | 47.2 | 47.4 | 47.4 |
| | Intrinsic viscosity [η] | dl/g | 0.8 | 0.8 | 0.8 | 1.0 | 0.8 |
| Flame retardant (B) | Kinds | — | B-1 | B-1 | B-1 | B-1 | B-1 |
| | Amount | % by mass | 18.0 | 18.0 | 18.0 | 18.0 | 18.0 |
| Flame retardant auxiliary agent (C) | Kinds | — | C-1 | C-1 | C-1 | C-1 | C-1 |
| | Amount | % by mass | 2.0 | 2.0 | 2.0 | 2.0 | 2.0 |
| Reinforcing material (D) | Amount | % by mass | 30.0 | 30.0 | 30.0 | 30.0 | 30.0 |
| Hydrotalcite compound (E) | Kinds | — | E-1 | E-1 | E-1 | E-1 | E-1 |
| | Amount | % by mass | 0.2 | 0.1 | 0.4 | 0.2 | 0.2 |
| Flammability test | UL 94 rating | — | V-0 | V-0 | V-0 | V-0 | V-0 |
| | Total time of flaming combustion | Seconds | 3 | 4 | 3 | 15 | 5 |
| Flexural test | Strength | MPa | 285 | 286 | 283 | 260 | 271 |
| | Distortion distance | mm | 4.0 | 4.0 | 3.9 | 3.8 | 4.0 |
| | Flexural modulus | MPa | 12700 | 12700 | 12700 | 12400 | 12000 |
| | Toughness | mJ | 63 | 63 | 62 | 57 | 62 |
| Reflow heat resistance temperature | | ° C. | 265 | 265 | 260 | 270 | 255 |
| Flow length | | mm | 70 | 71 | 69 | 60 | 70 |
| Residence stability | | Seconds | 600 | 600 | >600 | 600 | 600 |
| Quantity of generated bromine gas | | ppm | 1000 | 1200 | 600 | 1000 | 1000 |

Examples 14 to 19 and Comparative Example 6

The above-mentioned each component was mixed in the ratio shown in Table 5, and the mixture was charged into a twin-screw extruder equipped with a vent set at 320° C. to obtain a composition in pellets by melt-kneading. Properties of the obtained flame-retardant polyamide composition are shown in Table 5.

TABLE 5

| | | Unit | Examples 14 | 15 | 16 | 17 | 18 | 19 | Comparative Example 6 |
|---|---|---|---|---|---|---|---|---|---|
| Polyamide resin (A) | Kinds | — | A-1 | A-1 | A-1 | A-1 | A-1 | A-1 | A-1 |
| | Amount | % by mass | 47.1 | 47.4 | 47.4 | 47.4 | 47.4 | 47.4 | 46.4 |
| | Intrinsic viscosity [η] | dl/g | 0.8 | 0.8 | 0.8 | 0.8 | 0.8 | 0.8 | 0.8 |
| Flame retardant (B) | Kinds | — | B-1 | B-1 | B-1 | B-1 | B-1 | B-1 | B-4 |
| | Amount | % by mass | 18.0 | 18.0 | 18.0 | 18.0 | 18.0 | 18.0 | 19.0 |
| Flame retardant auxiliary agent (C) | Kinds | — | C-1 | C-1 | C-1 | C-1 | C-1 | C-1 | C-1 |
| | Amount | % by mass | 2.0 | 2.0 | 2.0 | 2.0 | 2.0 | 2.0 | 2.0 |
| Reinforcing material (D) | Amount | % by mass | 30.0 | 30.0 | 30.0 | 30.0 | 30.0 | 30.0 | 30.0 |
| Hydrotalcite compound (E) | Kinds | — | E-1 | E-2 | E-3 | E-4 | E-5 | E-6 | E-1 |
| | Amount | % by mass | 0.5 | 0.2 | 0.2 | 0.2 | 0.2 | 0.2 | 0.2 |
| Flammability test | UL 94 rating | — | V-0 | V-0 | V-0 | V-0 | V-0 | V-0 | V-0 |
| | Total time of flaming combustion | Seconds | 3 | 4 | 4 | 3 | 2 | 3 | 33 |
| Flexural test | Strength | MPa | 280 | 284 | 274 | 285 | 283 | 280 | 283 |
| | Distortion distance | mm | 3.8 | 4.0 | 3.8 | 4.1 | 4.0 | 3.9 | 3.7 |
| | Flexural modulus | MPa | 12700 | 12700 | 12500 | 12700 | 12700 | 12600 | 12500 |
| | Toughness | mJ | 59 | 63 | 60 | 64 | 63 | 61 | 57 |
| Reflow heat resistance temperature | | ° C. | 250 | 265 | 260 | 265 | 250 | 265 | 260 |
| Flow length | | mm | 67 | 70 | 69 | 70 | 72 | 68 | 59 |
| Residence stability | | Seconds | >600 | 540 | 480 | 480 | >600 | 540 | 420 |
| Quantity of generated bromine gas | | ppm | 400 | 1400 | 1800 | 2000 | 800 | 1500 | 1700 |

INDUSTRIAL APPLICABILITY

A flame-retardant polyamide composition of the present invention is excellent in mechanical properties such as toughness, in heat resistance, incombustibility and flowability in a reflow soldering process, and in heat stability during molding.

Especially, it is useful for an electric and electronic field that assembles such thin molded articles as a fine pitch connector by a surface mounting method using a high-melting solder such as a lead-free solder or a precision molding field.

The invention claimed is:

1. A flame-retardant polyamide composition comprising:

(A) 20 to 80% by mass of a polyamide resin;

(B) 5 to 40% by mass of a flame retardant; and (C) 0.5 to 10% by mass of a flame retardant auxiliary agent (where the total of (A), (B), and (C) does not exceed 100% by mass), wherein the bromine content in the flame retardant (B) being 65 to 71% by mass, the weight-average molecular weight of the flame retardant (B) being 1000 to 4800, and the melt flow rate of the flame retardant (B) being 200 to 1000 g/10 minutes as measured at 270° C. under a load of 1200 g and an orifice inner diameter of 2.095 mm.

2. The flame-retardant polyamide composition according to claim 1, wherein the polyamide resin (A) comprises (a-1) a polyfunctional carboxylic acid component unit composed of 30 to 100% by mol of terephthalic acid unit, 0 to 70% by mol of a polyfunctional aromatic carboxylic acid component unit other than terephthalic acid and/or 0 to 70% by mol of a polyfunctional aliphatic carboxylic acid component unit having 4 to 20 carbon atoms, and (a-2) a polyfunctional amine component unit having 4 to 25 carbon atoms.

3. The flame-retardant polyamide composition according to claim 1, wherein a melting point and an intrinsic viscosity [η] as measured in concentrated sulfuric acid at 25° C. of the polyamide resin (A) are 280 to 340° C. and 0.5 to 1.2 dl/g, respectively.

4. The flame-retardant polyamide composition according to claim 1, wherein a molecular weight distribution (weight-average molecular weight (Mw)/number-average molecular weight (Mn)) of the flame retardant (B) is 1.05 to 1.25.

5. The flame-retardant polyamide composition according to claim 1, wherein the flame retardant auxiliary agent (C) is at least one kind or more selected from an antimony compound, zinc borate, zinc stannate, zinc phosphate, calcium borate, and calcium molybdate.

6. The flame-retardant polyamide composition according to claim 1, wherein it contains 0 to 60% by mass of at least one kind or more selected from a glass, mica, and titanium oxide as a reinforcing material (D) (where the total of (A), (B), (C) and (D) does not exceed 100% by mass).

7. The flame-retardant polyamide composition according to claim 1, wherein it contains 0.05 to 0.4% by mass of a hydrotalcite compound (E) (where the total of (A), (B), (C) and (E) does not exceed 100% by mass).

8. The flame-retardant polyamide composition according to claim 7, wherein the hydrotalcite compound (E) is represented by the following formula (1):

$$Mg_{1-x}Al_x(OH)_2(A)^{n-}{}_p mH_2O \quad (1)$$

Here, $0.27 \leqq x \leqq 0.35$, $p=x/n$, A: an anion with n-valency, and $0.3<m<0.7$.

9. A molded article obtained by molding the flame-retardant polyamide composition according to claim 1.

10. An electric and electronic part obtained by molding the flame-retardant polyamide composition according to claim 1.

* * * * *